United States Patent [19]

Nakajima et al.

[11] 4,227,046
[45] Oct. 7, 1980

[54] PRE-PROCESSING SYSTEM FOR SPEECH RECOGNITION

[75] Inventors: Akira Nakajima, Kodaira; Akira Ichikawa, Kokubunji, both of Japan

[73] Assignee: Hitachi, Ltd., Japan

[21] Appl. No.: 880,951

[22] Filed: Feb. 24, 1978

[30] Foreign Application Priority Data

Feb. 25, 1977 [JP] Japan ................................. 52-19240

[51] Int. Cl.² ............................................. G10L 1/00
[52] U.S. Cl. ................................ 179/1 SD; 179/1 D; 179/1 P
[58] Field of Search ................. 179/1 SA, 1 SD, 1 D, 179/1 P

[56] References Cited

U.S. PATENT DOCUMENTS

| 3,803,357 | 4/1974 | Sacks | 179/1 D |
| 4,025,721 | 5/1977 | Graupe et al. | 179/1 P |
| 4,032,710 | 6/1977 | Martin et al. | 179/1 SA |
| 4,052,559 | 10/1977 | Paul et al. | 179/1 P |
| 4,058,676 | 11/1977 | Wilkes et al. | 179/1 SA |

OTHER PUBLICATIONS

F. Terman, "Radio Engineers' Handbook", McGraw-Hill, pp. 244, 245.

*Primary Examiner*—Malcolm A. Morrison
*Assistant Examiner*—E. S. Kemeny
*Attorney, Agent, or Firm*—Craig & Antonelli

[57] ABSTRACT

A pre-processing system for a speech recognition system nullifies the distortion in a received signal caused by the transmission line by forming a normalized received signal whereby the distortion is cancelled: the received signal is spectrally averaged to form a mean spectrum which is used to adjust a filter to a characteristic inverse to the distortion; this filter then filters the received signal to form the normalized received signal $s_j'(\omega,t) = S_j(\omega,t)/\overline{S_j(\omega)}$ which is equal to the normalized source signal $= S_i(\omega,t)/\overline{S_i(\omega)}$.

11 Claims, 5 Drawing Figures

PRE-PROCESSING SYSTEM FOR SPEECH RECOGNITION

LIST OF PRIOR ART (37 CFR 1.56(a))

The following references are cited to show the state of the art:

Published examined Japanese Patent Applications No. 18007/74 and No. 19020/75.

BACKGROUND OF THE INVENTION

This invention relates to a pre-processing system for speech recognition in which a speech waveform is received as an input, such as phoneme recognition, speaker verification and speaker identification.

As the speech recognition, there are the phoneme recognition for recognizing monosyllables, the speaker verification for verifying if the speaker is the person himself, the speaker identification for judging who is the speaker, etc. A known system employing such speech recognition is, for example, an information service system in which a computer system and a telephone line network are coupled.

In the information service system, a push-button signal or a speech signal is received as an input, and speech from a speech response unit is delivered as an output. The input speech is transmitted via the telephone line network to the computer system which is a central information service station.

Since, in this manner, the speech input is sent through the telephone line network, it is affected by the transmission characteristic of the network and becomes distorted. Besides, the transmission characteristic of the network is not uniform since it differs depending on transmission paths. Therefore, the speech signals to be received are subjected to various distortions.

Accordingly, in the case where the speech recognition is carried out with the received signal having been thus distorted, the probability of erroneous recognition is high. This can be a serious problem.

SUMMARY OF THE INVENTION

An object of this invention is to provide a pre-processing system for speech recognition which prevents input speech from being influenced by disparity in the transmission characteristics of transmission lines, thereby greatly enhancing the probability of correct recognition.

In order to accomplish this and other objects, this invention comprises a pre-processing system for speech recognition wherein a predetermined boundary of input speech is analyzed to extract a spectrum of information in the boundary. The input speech is passed through an inverse filter having a characteristic inverse to the spectrum, thereby to negate the influence of a transmission characteristic on the input speech.

DETAILED DESCRIPTION OF THE PREFERRED EMBODIMENTS

Figure 1:
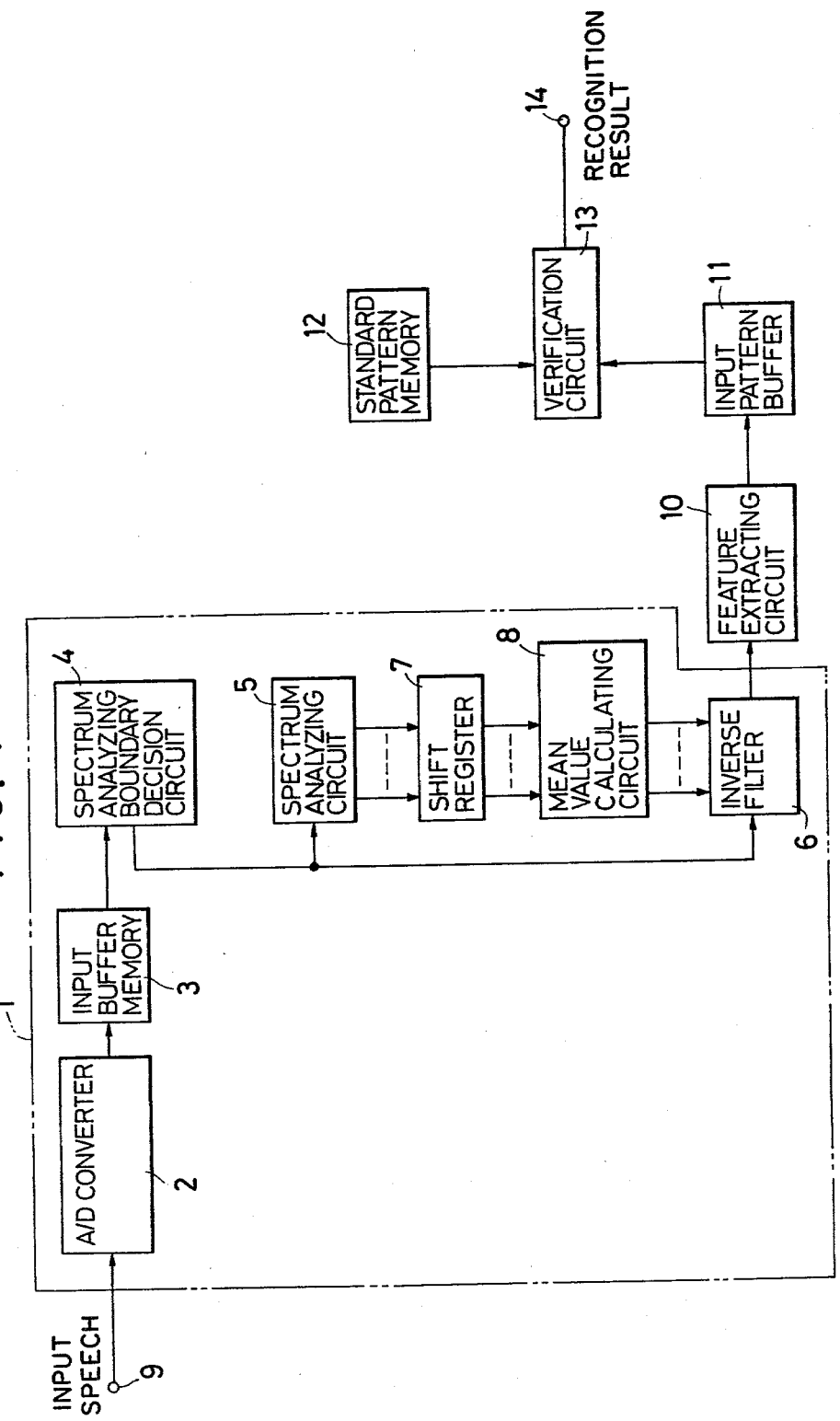
FIG. 1 shows a block diagram of an embodiment of a speech recognition system which includes a pre-processing unit according to this invention.

Before describing the embodiments of this invention, the principle of the invention will be explained.

Letting $S_i(\omega, t)$ denote the frequency spectrum of input speech, $H_n(\omega)$ denote the spectrum of a transmission system (which is assumed to be invariable versus time after the transmission circuit has been constructed), and $S_j(\omega, t)$ denote the spectrum of received input speech, the following relation holds:

$$S_j(\omega, t) = S_i(\omega, t) \cdot H_n(\omega) \tag{1}$$

Here, $\omega$ represents the angular frequency and $t$ the time. $S_i(\omega, t)$ signifies the component S of the angular frequency $\omega$ at a certain point of time $t$ in an input speech waveform i. Letting $\overline{S_j}(\omega)$ denote the mean spectrum of an analyzing boundary of the received speech as determined by a separately specified procedure (for example, the whole speech in a certain procedure), there holds:

$$\overline{S_j}(\omega) = \overline{S_i}(\omega) \cdot H_n(\omega) \tag{2}$$

Here, $\overline{S_i}(\omega)$ represents the mean spectrum of the original input speech in a boundary corresponding in time to $\overline{S_j}(\omega)$. It is presumed here that the transmission characteristic does not vary in the predetermined boundary of the input speech. The spectrum $I_n(\omega)$ of an inverse filter having a characteristic inverse to $\overline{S_j}(\omega)$ becomes:

$$I_n(\omega) = 1/\overline{S_j}(\omega) = 1/(\overline{S_i}(\omega) \cdot H_n(\omega)) \tag{3}$$

Therefore, an output $S_j'(\omega, t)$ which is obtained by passing the received speech through the inverse filter becomes:

$$\begin{aligned} S_j'(\omega, t) &= S_j(\omega, t) \cdot I_n(\omega) \\ &= S_i(\omega, t) \, H_n(\omega) \sqrt{S_i}(\omega) \, H_n(\omega) \\ &= S_i(\omega, t) \sqrt{S_i}(\omega) \end{aligned} \tag{4}$$

so that the influence of the spectrum $H_n(\omega)$ of the transmission system can be eliminated. If standard speech $S_s(\omega, t)$ itself is deemed the input speech, it is subjected to a procedure similar to that of $S_i(\omega, t)$ in advance, and the following output $S_o'(\omega, t)$ is evaluated:

$$S_o'(\omega, t) = S_s(\omega, t)/\overline{S_s}(\omega) \tag{5}$$

Here, $\overline{S_s}(\omega)$ represents the mean spectrum of the standard speech in a predetermined boundary.

Feature parameters are calculated between $S_o'(\omega, t)$ and $S_j'(\omega, t)$, and the extent of the agreement is evaluated. Then, a recognition which is affected by the transmission characteristic of neither of the input and standard speeches can be executed. Due to $\overline{S_i}(\omega)$ or $\overline{S_s}(\omega)$ appearing in the denominator, the phoneme in the analyzing boundary has an influence. However, insofar as the analyzing boundaries of both the input and standard speeches coincide, $\overline{S_i}(\omega)$ becomes equal to $\overline{S_s}(\omega)$ when $S_i(\omega, t)$ and $S_s(\omega, t)$ are equal.

The speech for constructing the inverse filter need not be quite the same as the speech to be recognized, but it may be the speech which has been passed through the identical transmission system and which has the same content as the speech for use in the processing of the standard speech.

Hereunder, the embodiments of this invention will be described in detail with reference to the accompanying drawings.

FIG. 1 shows an embodiment of a speech recognition system which includes a pre-processing unit according to this invention. Numeral 1 designates the portion of the pre-processing unit according to this invention.

In the pre-processing unit 1, numeral 2 designates an analog/digital converter, numeral 3 an input buffer memory, numeral 4 a spectrum analyzing boundary-decision circuit, numeral 5 a spectrum analyzing circuit, numeral 6 an inverse filter, numeral 7 a shift register, numeral 8 a mean value calculating circuit, and numeral 9 an input terminal.

Numeral 10 indicates a feature extracting circuit, numeral 11 an input pattern buffer, numeral 12 a standard pattern memory, numeral 13 a verification circuit, and numeral 14 an output terminal.

In the system of FIG. 1, input speech entered from the input terminal 9 through a transmission system is converted into digital signals at fixed sampling periods, for example, every 100 μsec (a sampling frequency of 10 KHz) by the A/D converter 2. The digital signals are recorded in the input buffer memory 3. A speech waveform recorded in the input buffer memory 3 covers the whole speech to be used for recognition. The spectrum analyzing boundary-decision circuit 4 investigates speech data in the input buffer memory 3, and decides the start point and the end point of a speech waveform boundary to be subjected to a spectral analysis. On the basis of the information of the start point and the end point of the speech waveform to be taken out as decided by the spectrum analyzing boundary-decision circuit 4, the speech data of fixed length in the input buffer memory 3 is taken out at regular intervals. This speech data is subjected to the spectral analysis by the spectrum analyzing circuit 5, and the results are sent to the shift register 7. Such operations are continued until the speech data reaches the end point of the analyzing boundary.

Upon completion of analyzing the whole speech, the mean value of the spectral analysis results is found by the mean value calculating circuit 8, and the characteristic of the inverse filter 6 is determined and set. The speech data in the input buffer memory 3 is subjected to filtering by the inverse filter 6, and is then converted into feature parameters for a plurality of divided boundaries by the feature extracting circuit 10. These feature parameters are recorded into the input pattern buffer 11. The verification circuit 13 verifies a standard pattern in the standard pattern memory 12 with the input pattern in the input pattern buffer 11, and the result is delivered from the output terminal 14. The standard pattern in the standard pattern memory 12 to be used in this case is one subjected to pre-processing by the pre-processing unit 1 in FIG. 1 and freed from the influence of the transmission system.

Figure 2:
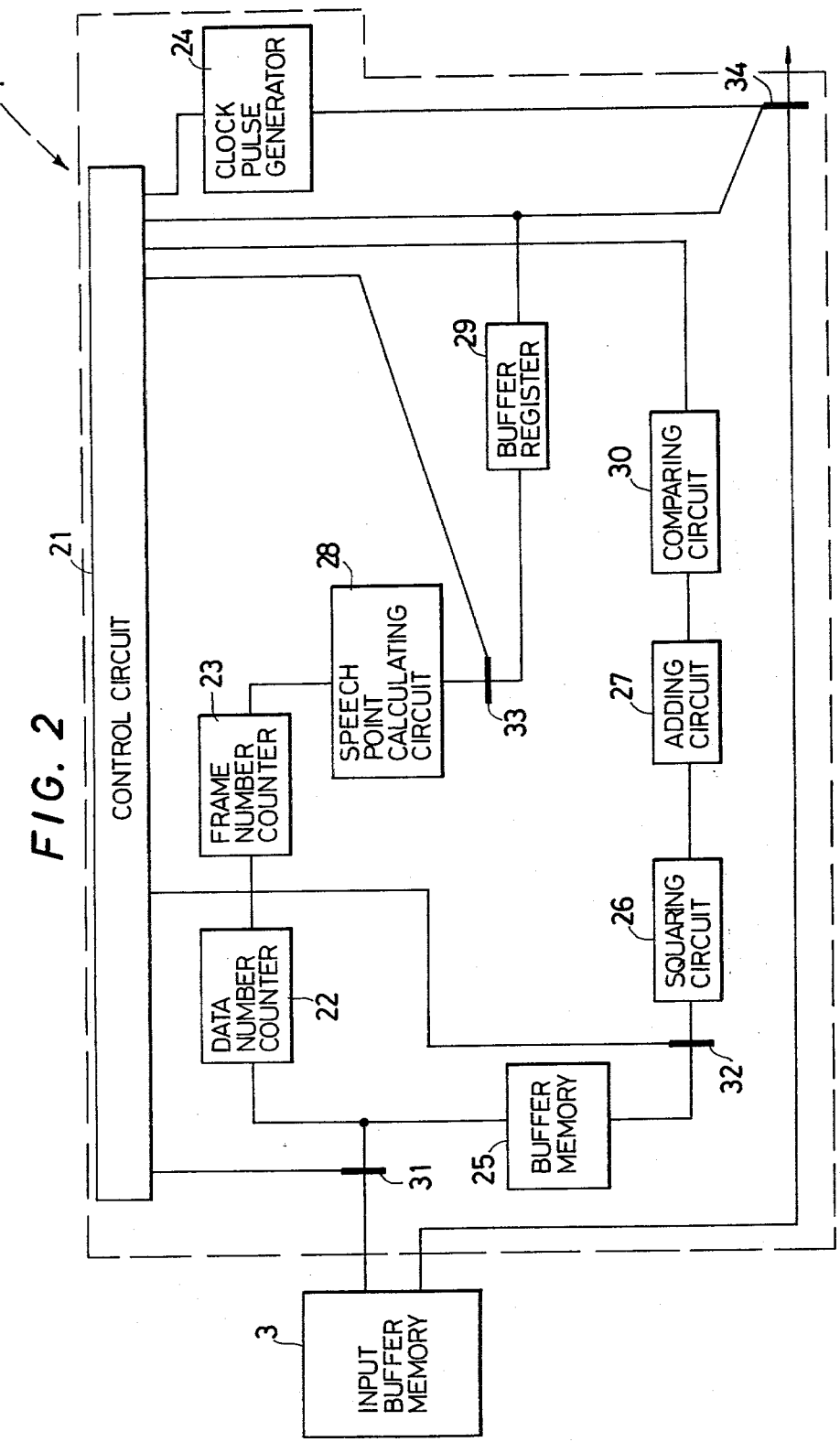
FIG. 2 is a block diagram showing an example of the specific arrangement of a spectrum analyzing boundary-decision circuit in FIG. 1.

FIG. 2 shows an example of the specific arrangement of the spectrum analyzing boundary-decision circuit 4 in FIG. 1.

As previously stated, all the speech waveforms to be recognized are contained in the input buffer memory 3. In this respect, it is difficult to correctly decide the start points and the end points of these speech waveforms at the time of the entrance into the input buffer memory 3. Therefore, more speech waveforms than the speech waveforms to be recognized are entered in the input buffer memory 3, and correct start points and end points are determined by the spectrum analysis boundary-decision circuit 4.

In FIG. 2, numeral 21 designates a control circuit, numeral 22 a speech data number counter, numeral 23 a frame number counter, numeral 24 a clock pulse generator, numeral 25 a buffer memory, numeral 26 a squaring circuit, numeral 27 an adding circuit, numeral 28 a speech point calculating circuit, numeral 29 a buffer register, and numeral 30 a comparing circuit. Numerals 31, 32, 33, and 34 are gates.

In operation, the data number counter 22 is reset and the gate 31 is enabled by the control circuit 21, whereby the speech data stored in the input buffer memory 3 is sequentially read out and sent to the buffer register 25 from the first one. Each time one speech data signal is sent, the data number counter 22 renews its content by one count. When the content has coincided with a number preset in the data number counter 22, i.e., the number of data within one frame, a coincidence signal is sent to the control circuit 21. Then, the control circuit 31 disables the gate 31 to stop the data transfer to the buffer register 25. Simultaneously, the data number counter 22 sends a coincidence signal to the frame number counter 23.

Each time the signal is received from the data number counter 22, the frame number counter 23 counts up by one and simultaneously sends a sign signal to the control circuit 21. Upon arrival of the sign signal from the frame number counter 23, the control circuit 21 enables the gate 32 to transfer the content of the buffer register 25 to the squaring circuit 26 and the adding circuit 27 in sequence. When the speech data corresponding to one frame has been transferred to the adding circuit 27, the sum of the squared speech waveform values is calculated, and the result is sent to the comparing circuit 30. The comparing circuit 30 compares a preset value (threshold value of short-time power) with the calculated result from the adding circuit 27, and sends a judgement signal to the control signal 21 representing whether the calculated result is greater or smaller than the threshold value.

When the judgement signal from the comparing circuit 30 is one representing that the calculated result is smaller than the threshold value, the control circuit 21 judges upon receipt of the signal that the start of the speech has not yet been reached. The control circuit 21 then resets the data number counter 22 and simultaneously enables the gate 31 to read out the speech data from the input buffer memory 3 and send said speech data to the buffer memory 25. Thus, the same operation as previously described is carried out.

On the other hand, when the received judgement signal is one representing that the calculated result is greater than the threshold value, the control circuit 21 judges that the speech has been started. It sends the information of the number of frames stored in the frame number counter 23 to the speech point calculating circuit 28, in which (number of frames − 1)×(number of data signals within one frame) is calculated, and it enables the gate 33 to send the calculated result to the buffer register 29. Simultaneously, the control circuit 21 sets into the frame number counter 23 a value with the minus sign affixed to the total frame number which is determined from the number of all the data signals in the input buffer memory 3. This enables the gate 31 to read out data corresponding to one frame from the last of the data within the buffer memory 23 and to load the data into the buffer register 25. Thereafter, the same operation as previously discussed is executed, and when the judgement signal representing that the calculated result is greater than the threshold value is sent from the comparing circuit 30 to the control circuit 21, the content of the frame number counter 23 is transferred to the speech point calculating circuit 28. At this time, the content of the frame number counter 23 has the minus sign, so that the number of frames with the minus sign is sent to the speech point calculating circuit 28 and is subjected to the same calculation as previously discussed. Since the calculated result is sent to the buffer register 29 through the gate 33, the information of the start point and end point of the speech, i.e., the information of the analytical boundary of the speech, is accumulated in the buffer register 29.

On the basis of the information of the start point and end point of the speech accumulated in the buffer register 29, and in conformity with the period of clock pulses generated by the clock pulse generator 24, the control circuit 21 enables the gate 34 to take out the speech data from the input buffer memory 3 and send it to the spectrum analyzing circuit 5 and the inverse filter 6.

The gates 31 and 34 have the function of reading out and transferring the speech data of the input buffer memory 3 upon commands from the control circuit 21. The control circuit 21 and the speech point calculating circuit 28 which perform the operations described above can be readily built by the use of known logical circuits.

Figure 3:
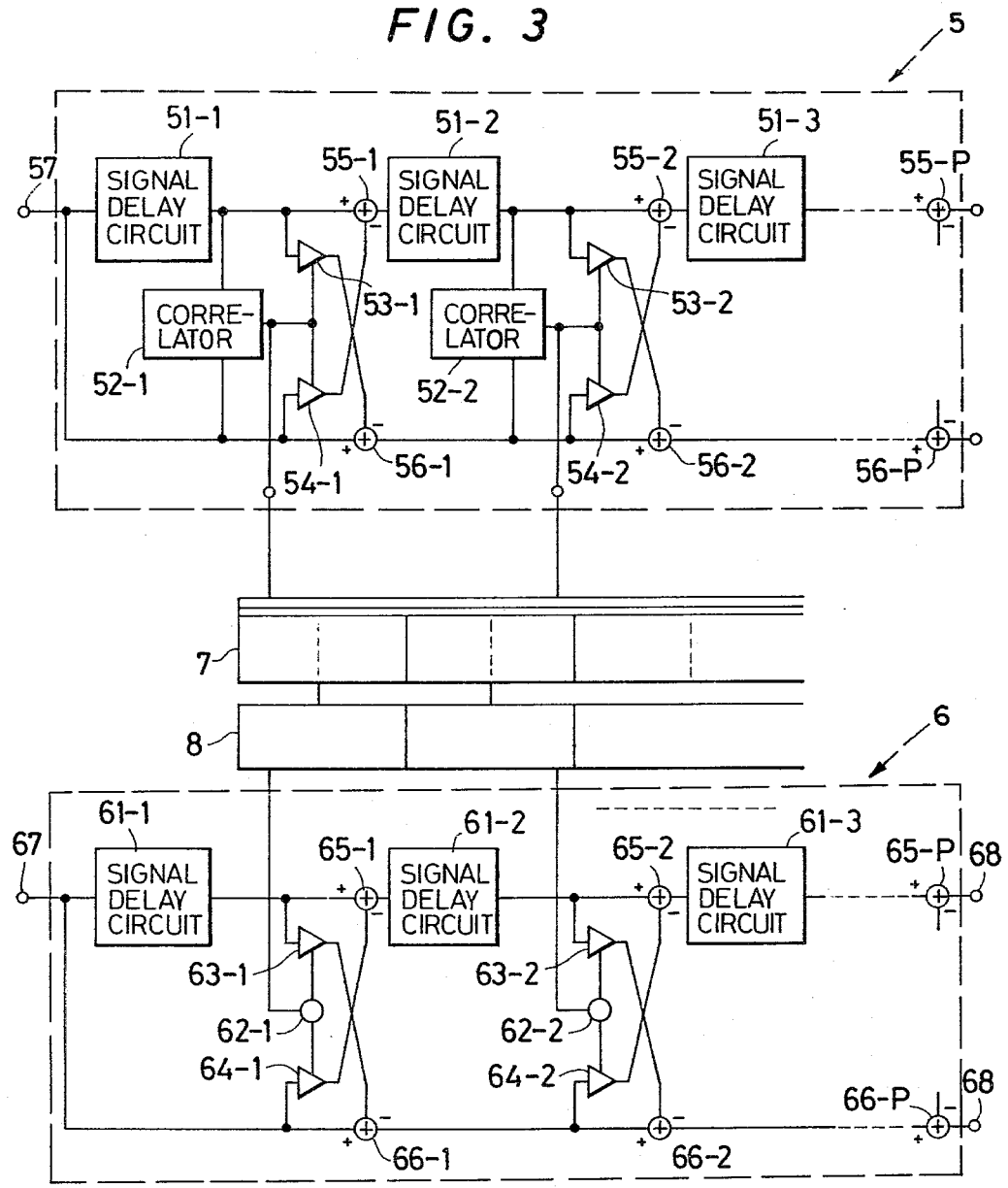
FIG. 3 is a block diagram showing an example of the specific arrangement of a spectrum analyzing circuit as well as an inverse filter in FIG. 1.

FIG. 3 shows an example of the specific arrangement of the spectrum analyzing circuit 5 as well as the inverse filter 6 in FIG. 1. The example exploits the PARCOR (partial auto correlation) analyzing technique which is a known technique (described in detail in, for example, Japanese Published Examined Patent Application No. 18007/74).

In the spectrum analyzing circuit 5 shown in FIG. 3, 51-1, 51-2, 51-3, . . . designate signal delay circuits; 52-1, 52-2, . . . correlators; 53-1, 53-2, . . . and 54-1, 54-2, . . . multipliers; and 55-1, 55-2, . . . , 55-p and 56-1, 56-2, . . . , 56-p adders. Numeral 57 indicates an input terminal.

In the inverse filter 6, 61-1, 61-2, 61-3, . . . designate signal delay circuits; 62-1, 62-2, . . . holding circuits; 63-1, 63-2, . . . and 64-1, 64-2, . . . multipliers; 65-1, 65-2, . . . , 65-p and 66-1, 66-2, . . . , 66-p adders. Numeral 67 indicates an input terminal, and numeral 68 an output terminal.

In operation, the speech to be analyzed is entered from the terminal 57 and is divided into two signals. One of the divided signals proceeds to the signal delay circuit 51-1. The other divided signal is further divided into three signals, which proceed respectively to the correlator 52-1, the multiplier 54-1 and the adder 56-1. The signal delayed by the signal delay circuit 51-1 is also divided into three signals, which proceed respectively to the correlator 52-1, the multiplier 53-1 and the adder 55-1.

The correlator 52-1 is a known device which has the function of evaluating the correlation between the two signals from the signal delay circuit 51-1 and the input terminal 57. The output of this correlator is delivered as a partial auto correlation coefficient (PARCOR coefficient) of the first order, while it is used as an input on one side of each of the multipliers 53-1 and 54-1. The PARCOR coefficient is accumulated in the shift register 7. Outputs from the multipliers 53-1 and 54-1 are frontward and backward preestimated waveform values of the first order, respectively. Their differences from the signals from the input terminal 57 and the signal delay circuit 51-1 are taken by the adders 56-1 and 55-1, respectively. As a result, frontward and backward preestimated signal differences of the first order are obtained and entered into the correlator 52-2 and the signal delay circuit 51-2, respectively. Thereafter, PARCOR coefficients up to the P-th order are similarly obtained, and they are entered into the shift register 7. Since the speech data enters the input terminal 57 successively at the sampling intervals, the PARCOR coefficients are calculated and loaded into the shift register 7 every moment. If the period of the register shift of the shift register 7 is made coincident with the sampling interval in advance, the PARCOR coefficients of the whole speech will be loaded in the shift register 7 for the respective orders at the time of the completion of the whole speech. The mean value calculating circuit 8 calculates the average of the PARCOR coefficients of the respective orders after the completion of the analysis of the whole speech, sets the average value into the inverse filter 6 as the PARCOR coefficient of the orders, and holds the value while the inverse filtering is being done.

The inverse filter 6 has substantially the same structure as that of the PARCOR analyzing filter in the spectrum analyzing circuit 5, and differs only in that the correlators 52 are replaced with holding circuits 62, in which the PARCOR coefficients obtained in the spectrum analyzing circuit 5 are previously set. It is a filter which has a characteristic inverse to the mean spectrum of the whole speech analyzed. The speech data in the input buffer memory 3 is entered from the input terminal 67, and is subjected to the filtering by the inverse filter 6.

The features extracting circuit 10 extracts feature parameters from the speech waveform subjected to the filtering by the inverse filter 6 and with the influence of the transmission system lessened. Specifically, there can be used, for example, a device in which PARCOR coefficients are extracted anew by the PARCOR filter employed in the spectrum analyzing circuit 5. Since the speech entered into the feature extracting circuit 10 is already free from the influence of the characteristic of the transmission system, the parameters to be used in the feature extracting circuit 10 may be ones which are affected by the transmission system.

In the above embodiment, the analytical boundary which is set by the spectrum analyzing boundary-decision circuit 4 has been made the whole speech. However, a similar effect can be achieved even when it is restricted to, for example, a certain boundary near the boundary in which the short-time speech power becomes the maximum value, a certain boundary from the beginning of the speech boundary waveform, and a certain boundary near the peak point of a pitch pattern.

Various systems of speech recognition can be applied to the circuitry succeeding the feature extracting circuit. By way of example, it is possible to exploit the foregoing PARCOR technique and employ as the feature parameters the values $k_1-k_{12}$ of the PARCOR coefficients of the first to twelfth orders under conditions of a feature extracting time interval of 10 milliseconds and a feature extraction analyzing boundary of 51.2 milliseconds. The time axis can then be normalized by the known DP (dynamic programming) technique (described in detail in, for example, Japanese Published Examined Patent Application No. 19020/1975). Thus, the speech recognition can be carried out.

Figure 4:
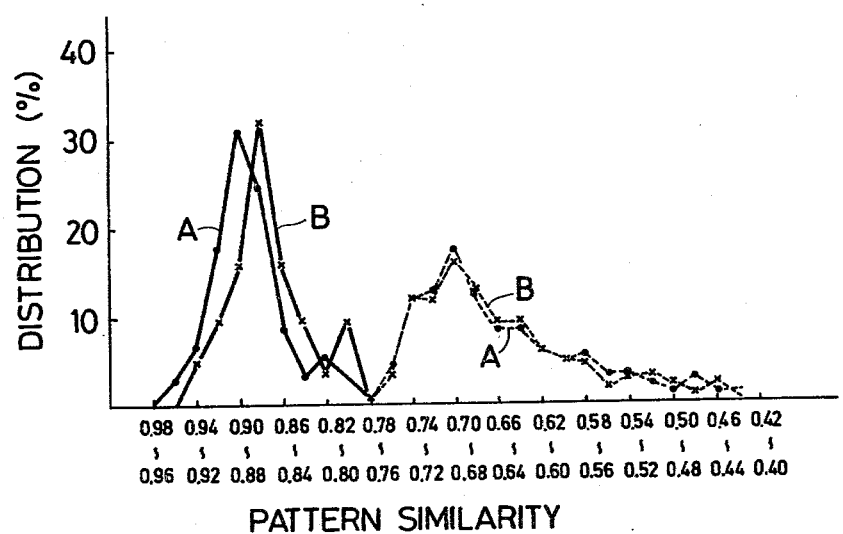
FIGS. 4 and 5 are characteristic diagrams for explaining the merit of the pre-processing system according to this invention.
Figure 5:
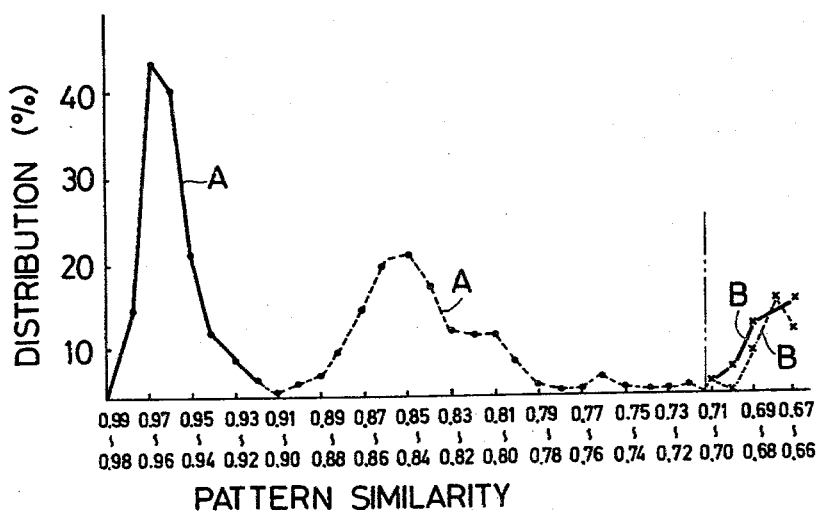

The effect of this invention was assessed on an example appllied to the speaker verification for judging if the speech entered is actually one of that of a certain person. The results are shown in FIGS. 4 and 5. If these figures, the axis of abscissas represents the pattern similarity S between the input speech and the standard speech, while the axis of ordinates represents the distribution thereof. In addition, a solid line indicates the pattern similarity for the input speech of the person himself, and a dotted line the pattern similarity for the input speech of a pretender. In one case where 300 sets were used, these being all the sets (pairs) of the speech of 4 male adults totalling 25 data signals (the content of the speech was the word of "irimame (popped beans)"). Combinations of their own were excluded. When this input speech and a standard speech were passed through a transmission system of flat characteristic, the erroneous rejection (in which the person himself was regarded as another person) amounted to 0% and the erroneous acceptance (in which another person being a pretender was regarded as the person himself) amounted to 0% as indicated by the solid line A and the dotted line A in FIG. 4 respectively. Thus the data was correctly judged 100%.

Regarding such data, the standard speech was passed through the transmission system of flat characteristic, the input speech was passed through a transmission system of differential characteristic, and the pre-processing of this invention was applied. Then, as indicated by the solid line B and the dotted line B in FIG. 4, the verification was not degraded at all, and the data could be correctly judged 100%. The similarity threshold value at or above which the speaker is judged to be the person himself was made a similarity of 0.78. Here, the pattern similarity S is given as follows, letting $r_i$ denote the similarity at each feature parameter extracting time and l denote the path length:

$$S = 1/l \Sigma_i r_i \quad (6)$$

The similarity $r_i$ is the similarity between vectors x and y of two feature parameters, and when:

$$x/i = (x_1, x_2, \ldots, x_n) \quad (7)$$
$$y/i = (y_1, y_2, \ldots, y_n)$$

it is defined as follows:

$$r_i = \frac{\sum_i x_i y_i}{\sqrt{(\Sigma x_i^2)(\Sigma y_i^2)}} \quad (8)$$

Without the pre-processing according to this invention, in the case where both the standard and input transmission characteristics were flat, no error occurred and the judgement was correct 100% as indicated by the solid line A and the dotted line A in FIG. 5. However, in the case where the standard was passed through the flat characteristic and the inputs were passed through the differential characteristic, all the pattern similarities S became 0.70 or below as indicated by the solid line B and the dotted line B in FIG. 5, and even the person himself was entirely rejected as another person or pretender. In this manner, the effect of this invention is very great.

As set forth above, according to this invention, the speech recognition can be executed at a sufficiently high probability even when speech is used which has gone through circuits of various transmission characteristics, such as telephone circuits.

It is to be understood that the invention is not restricted to the foregoing embodiments, but rather that a variety of modifications may be readily devised by those skilled in the art which embody the principles of the invention and fall within its spirit and scope.

We claim:

1. A pre-processing system for speech recognition comprising:

first means for receiving input speech which has been transmitted through a transmission medium, said first means providing an output representative of said input speech;

second means connected to the output of said first means for determining the mean frequency spectrum of the input speech received by said first means and providing an output representative of said mean frequency spectrum; and filter means, connected to the outputs of said first and seconds means, having a frequency spectrum response inversely proportional to the mean frequency spectrum determined by said second means, for filtering the input signal received by said first means.

2. A pre-processing system for speech recognition according to claim 1, which further comprises third means connected between said first and second means, for determining a time boundary for analyzing said frequency spectrum of the input speech on the basis of the input speech received by said first means and for inputting the input speech in the determined time boundary to said second means.

3. A pre-processing system for speech recognition according to claim 2, wherein said third means determines the time boundary for analyzing said frequency spectrum of the input speech by determining the start and end points of said input speech.

4. A pre-processing system for speech recognition according to claim 1, wherein said first means comprises conversion means for converting the input speech into a digital signal, and storage means for storing the input speech converted by said conversion means.

5. A pre-processing system for speech recognition according to claim 1, wherein said second means comprises means for extracting partial auto-correlation coefficients of first to N-th (N being a positive integer) orders on the basis of the input speech received by said first means.

6. A pre-processing system for speech recognition according to claim 2, wherein said second means comprises means for extracting partial auto-correlation coefficients of first to N-th (N being a positive integer) orders on the basis of the input speech received by said first means.

7. A pre-processing system for speech recognition according to claim 5, wherein said second means comprises extraction means for extracting the partial auto-correlation coefficients of first to N-th orders from each of plural portions of the input speech, and calculation means for calculating a means value of the partial auto-correlation coefficients extracted by said extraction means.

8. A pre-processing system for speech recognition according to claim 6, wherein said filter means includes a holding means into which is set the mean partial auto-correlation coefficients calculated by said calculation means.

9. A pre-processing system for speech recognition according to claim 5, wherein said extracting means comprises a delay circuit for delaying the input speech received by said first means and a correlator for evaluating the correlation between the input speech delayed by said delay circuit and the input speech received by said first means and for obtaining as an output the partial auto-correlation coefficient, first and second calculation means for obtaining frontward an backward preestimated waveform values, respectively, and third and fourth calculation means for obtaining frontward and backward preestimated signal differences, respectively.

10. A pre-processing system for speech recognition according to claim 5, wherein said extracting means comprises:
 a first delay circuit for delaying the input speech received by said first means;
 a first correlator for evaluating the correlation between the input speech delayed by said first delay circuit and the input speech received by said first means and for obtaining as a first coefficient output the PARCOR coefficient of the first order;
 first frontward and backward multipliers for multiplying the input speech from said first delay circuit and the input speech from said first correlator and obtaining frontward and backward preestimated waveform values of the first order, respectively;
 a first frontward adder for calculating the difference between the delayed input speech from said first delay circuit and the backward preestimated waveform value from said first backward multiplier and for obtaining frontward preestimated signal difference of the first order;
 a first backward adder for calculating the difference between the input speech from said first means and the frontward preestimated waveform value from said first frontward multiplier and for obtaining backward preestimated signal difference of the first order;
 second to Nth correlators for evaluating the correlation between signals from said first to N-1th frontward adders, respectively;
 second to Nth correlators for evaluating the correlation between signals from said second to Nth delay circuits and signals from said first to N-1th coefficient outputs the PARCOR coefficients of the second to N-th order, respectively;
 second to N-th frontward multipliers for multiplying signals from said second to N-th delay circuits by signals from said second to N-th correlators, respectively;
 second to N-th backward multipliers for multiplying signals from said first to N-th backward adders by signals from said second to Nth correlators, respectively;
 second to N-th frontward adders for obtaining difference between signals from said second to N-th delay circuits and signals from said second to N-th backward multipliers, respectively; and
 second to Nth backward adders for obtaining the difference between signals from said second to N-th frontward multipliers and signals from said first to N-1th backward adders.

11. A pre-processing system for speech recognition comprising:
 first means for receiving an input speech signal which is a product of true speech and a distortion signal produced by transmission characteristics of a transmission system over which said speech is transmitted, wherein said first means provides an output representative of said received input speech signal;
 second means connected to the output of said first means for determining the mean frequency spectrum of the received input speech signal and providing an output representative of said mean frequency spectrum; and
 filter means, connected to the outputs of said first and second means, for using the mean frequency spectrum determined by the second means to provide a frequency response inversely proportional to the mean frequency spectrum determined by said second means, and for filtering the signal received from the first means representing the received input speech signal with the inversely proportional frequency spectrum to eliminate the distortion signal present in said received input speech signal.

* * * * *